Aug. 27, 1957 F. R. MALLALIEU 2,804,504

DIRECT CALL SECRECY INTERCOMMUNICATION SYSTEM

Filed Feb. 13, 1956 2 Sheets-Sheet 1

INVENTOR
FRANK R. MALLALIEU
BY
ATTORNEYS

Aug. 27, 1957 F. R. MALLALIEU 2,804,504

DIRECT CALL SECRECY INTERCOMMUNICATION SYSTEM

Filed Feb. 13, 1956 2 Sheets-Sheet 2

INVENTOR
FRANK R. MALLALIEU
BY
ATTORNEYS 2,804,504

DIRECT CALL SECRECY INTERCOMMUNICATION SYSTEM

Frank R. Mallalieu, Oxford, Pa.

Application February 13, 1956, Serial No. 565,098

8 Claims. (Cl. 179—38)

Figure 1:
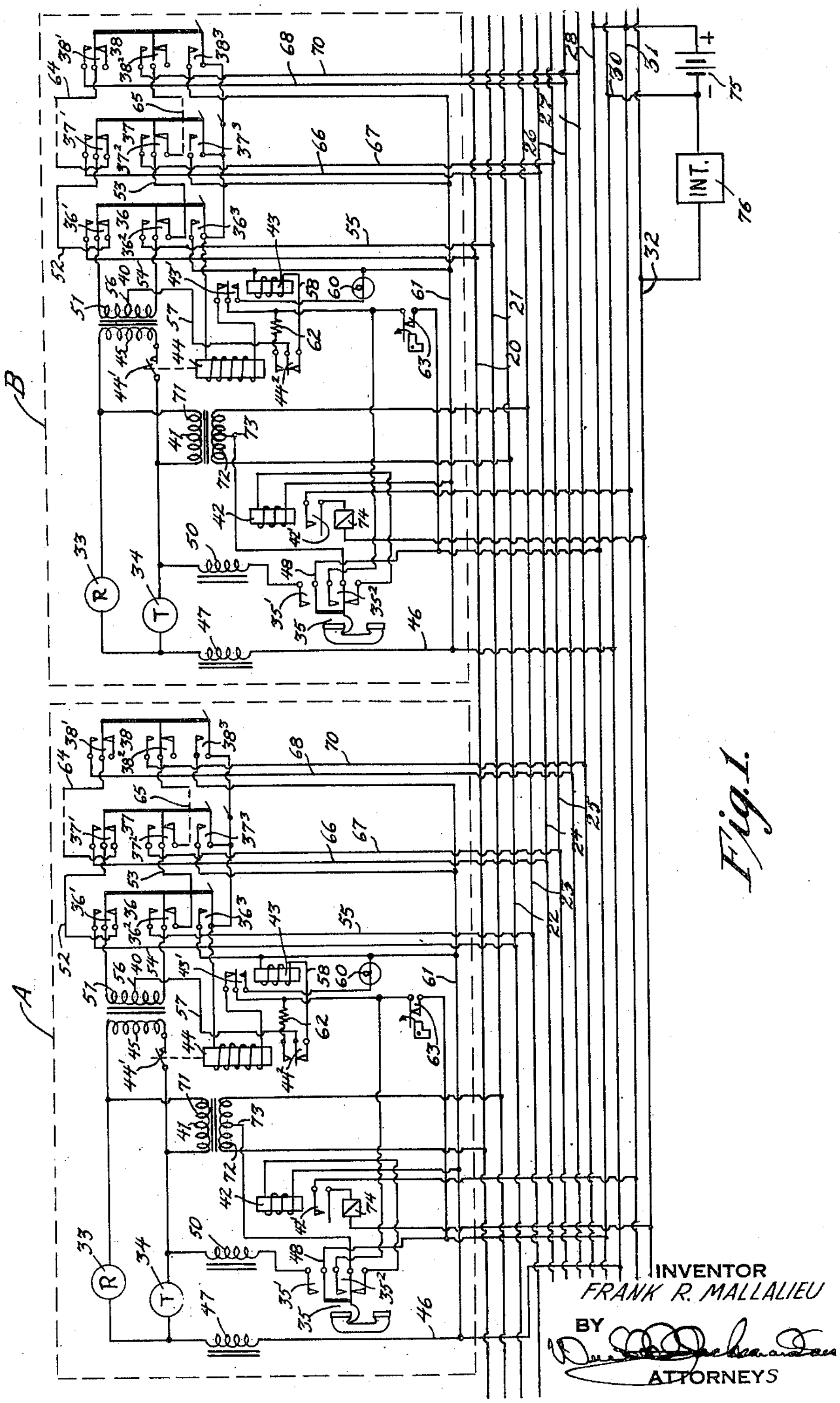

The present invention relates to intercommunication systems of the direct call secrecy type, and particularly to a sequential lock-out circuit for such a system.

The lock-out circuit according to the invention employs a test relay and also a marking relay, instead of merely a single relay for the line. The test relay tests the called line, and if the line is not busy the marking relay operates and marks the line busy and makes the connection for talking.

U. S. Patent No. 2,181,715 shows a two-relay lock-out system which has been commercially unsuccessful. One of the difficulties is that the continuous ringing signal is objectionable to the user. Another difficulty is that a ringing key is required to produce the proper operation of the test relay and the marking relay in this prior art device. The ringing key is inconvenient to the user since it requires an additional manual operation, but it also creates the possibility that if the ringing key is depressed first or simultaneously with the calling key, the marking relay may operate before the test relay can operate and improperly establish a connection to a busy line as later explained.

By the present invention this difficulty is avoided.

A purpose of the invention is to obtain automatic ringing without the necessity of a ringing key.

A further purpose is to assure secrecy by avoiding the possibility that improper operation of the ringing key could cause connection to a busy circuit.

A further purpose is to permit connection of the test relay between one side of the outgoing line and one pole of the source of operating power rather than merely bridging across the outgoing line.

A further purpose is to provide interconnection between the sets through a simplex circuit, and use the simplex circuit to assist in lockout.

A further purpose is to interpose the test relay between one side of the outgoing line and the power source, making the power source either at the same polarity or the opposite polarity as the line side.

A further purpose is to improve the privacy mechanism in an intercommunication system by employing nonmarginal type relays and automatic intermittent ringing.

A further purpose is to optionally employ a simplex circuit or a direct line connection.

A further purpose is to avoid the possibility that the user by varying the technique of operation, could break down the secrecy.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

The drawings are electrical diagrams of variations in the invention.

It will be evident that in the prior art a relay, commonly called the lock-out relay, tested a called line when momentarily applied to the line by a manual ringing switch. If the hand set at the called station was resting on its mounting at the time of test, the lock-out relay operated and was held operated by mechanical or electrical means, and a circuit for talking was prepared at the called set. If another party either accidentally or by design initiated a call to the same called set at the same time, his relay also operated and prepared his set for talking, provided he called before the party at the called set lifted his hand set.

In my copending application, Serial No. 565,089 filed February 13, 1956, for Intercommunicating Telephone Equipment I illustrate a system which overcomes this difficulty, because the first calling set seizes the line and marks it busy without any action being required at the called set. This type of operation, however, causes the call receiving relay at the called set to operate continuously, producing continuous ringing, and it was necessary for me to introduce an intermittent element to provide intermittent ringing at the called sets. Unlike many of the prior art devices, the ringing is automatic and manual ringing switches are eliminated.

The present invention employs two sequentially operating relays to accomplish the above functions. This is advantageous because the characteristics of the two relays are much less critical than those imposed on the single self-shunting relay of my copending application. Accordingly, the relays are less expensive and less maintenance is required. Also the circuit is operative notwithstanding wider variation in the voltage of the power source.

Figure 1 shows a sequential lock-out circuit applied to a simplex circuit. I there illustrate intercommunicating sets A and B, set B being illustrative of a series of stations along the intercommunicating multiple which can be called.

The wiring multiple employed in communication between station A and station B includes wires 20, 21, of one pair and wires 22, 23 of another pair. In addition there are wires 24, 25 and 26, 27 which are employed in communicating with other stations, not shown. Positive continuous power line 28 and negative continuous power line 30 are provided at all stations as well as positive intermittent power line 31 and negative intermittent power line 32.

Each station includes a receiver 33 and a transmitter 34 preferably incorporated in a single instrument which in inactive position is placed on a hook switch 35. Calling switches 36, 37 and 38 are provided at the respective stations, along with simplex transformers 40 and 41, a call receiving relay 42, a test relay 43, and a marking relay 44.

Considering first the electric circuit in detail, the local talking circuit includes the receiver 33, the transmitter 34, primary coil 45 of transformer 40 and normally open contact 44' of marking relay 44.

The power connection to the local talking circuit is made at a point between the transmitter and receiver remote from the transformer through choke coil or resistor 47 by wire 46, connected by wire 30 to the negative continuous side of the power source. Wire 28 on the positive continuous side of the power source connects through wire 48 and normally open contact cluster 35' of hook switch 35 through choke coil or resistor 50 to the local talking circuit between the transmitter and contacts 44'. The secondary 51 of transformer 40 has its ends connected to the movable contacts of contact clusters 36' and 36² of calling switch 36, the normally closed contacts of these contact clusters being connected by wires 52 and 53 with the movable contacts of contact clusters 37' and 37² of calling switch 37. The normally open contacts of contact clusters 36′ and $36^2$ are in the case of set A connected by wires 54 and 55 respectively with home line wires 22 and 23 of set B, and in the case of set B these contacts are connected with home line wires 20 and 21 of set A.

The center tap 56 of transformer winding 51 is connected by wire 57 with the movable contact of contact cluster $44^2$ of marking relay 44. The normally closed contact of this contact cluster is connected by wire 58 with one end of the coil of test relay 43, the opposite end of which connects to the normally open movable contact of contact cluster $36^3$ of calling switch 36, and also with one side of busy signal lamp 60, and with wire 61 which connects with the negative uninterrupted power wire 30. The opposite side of the busy indicator 60 is connected to the normally open contact of contact cluster 43′ of test relay 43. The movable contact of contact cluster 43′ is connected to one side of resistor 62, the opposite side of which is connected to normally open contact of contact cluster $44^2$ of the marking relay, and also is connected to the normally open contact of contact cluster $35^2$ of the hook switch, and also through normally closed contacts 63 (to be described) to uninterrupted positive power wire 28.

The normally closed contact of contact cluster 43′ of the test relay is connected to one side of the coil of marking relay 44, the opposite side of coil being connected to the movable contact of contact clusters $36^3$, $37^3$ and $38^3$ of the calling switches. The normally open fixed contacts of contact clusters $36^3$, $37^3$ and $38^3$ are connected by wires 61 and 30 to the negative uninterrupted side of the power source 75.

In calling switch 37, the normally closed contacts of contact clusters 37′ and $37^2$ are respectively connected by wires 64 and 65 to the movable contacts of contact clusters 38′ and $38^2$ of calling switches 38. The normally opened contacts of contact clusters 37′ and $37^2$ are connected by wires 66 and 67 respectively with lines 24 and 25. The normally open contacts of contact clusters 38′ and $38^2$ of calling switches 38 are connected by wires 68 and 70 with lines 26 and 27. The normally closed fixed contacts in these contact clusters need not be connected unless additional calling switches and stations are involved.

Transformer 41 has a primary winding 71 connected across the series connected receiver and transmitter in the local talking circuit. The extremities of secondary 72 of this transformer are connected to home lines 20 and 21 in set A and to home lines 22 and 23 in set B. The mid-tap 73 of this transformer is connected to the movable contact of contact cluster $35^2$ of the hook switch. The normally closed fixed contact of this contact cluster is connected to one end of the coil of call receiving relay 42, the opposite end of which is connected to negative uninterrupted power wire 30. Normally open contact cluster 42′ of call receiving relay 42 is connected between positive interrupted power line 31 and ringing signal 74, the opposite side of which is connected to negative interrupted power line 32.

The power source 75, suitably providing direct current, has its positive side connected to power lines 28 and 31 and its negative side connected to power line 30 and to one side of interrupter 76, the opposite side of which is connected to power line 32.

Considering now the operation of the device of Figure 1, it will be understood that as many sets are provided as required and that all of the sets will operate similarly to the two sets being described. The wires of the multiple run through all of the sets. Each one of the pairs of wires in the multiple is assigned to one of the sets alone as a home line, for example the home line of set A consists of wires 20, 21 and the home line of set B consists of wires 22, 23. The call receiving relay of the particular set is connected to the home line through intervening circuitry. Except for the home line the pairs of the multiple are connected to the calling switches. Thus the operation of the calling switch connects the calling circuit of the set to the home line of the called set. The calling switches usually are arranged so that they make the connections disjunctively, that is, so that the two called lines cannot be strapped together by the simultaneous application of two keys on a calling set.

The sets may include a varied number of switches, depending upon the needs of the individual user to call more or fewer stations. In case the set has fewer calling switches than there are pairs in the multiple, the set is connected to certain pairs of the multiple and this is called a selectively connected set. An other feature of the operation of direct call systems is that the set may be called by an unlimited number of other sets since the home line of a given set can be carried to as many other sets as desired. Each of these sets may have a calling switch connected to the particular home line and no change in the called set is required as more stations are added.

In the sets shown, the feeding coils 47 and 50 feed direct current from the source to the transmitter, while impeding the flow of voice current back to the source. The transmitter couples the talking circuit to the outgoing line through the calling switches. Transformer 41 couples the local talking circuit with the home line portion, including the hook switch 35, the call receiving relay 42 and its contact and the ringing signal 74.

The relays which operate in sequence to give the desired lock-out action are test relay 43 and marking relay 44.

If set A calls set B, the hand set at set A is removed, operating hook switch A35, and calling switch A36 is operated and desirably latched by mechanism well known in the art. Winding A51 of transformer A40 is connected to winding B72, since the upper end of winding 51 is connected through make contact of contact cluster A36′, and wire 22 to the lefthand end of winding B72, and the other end of winding B72 is connected by wire 23 and by wire A55 to make contact $A36^2$ and then to the lower end of winding A51. As a result of the closing of contacts $A36^3$, test relay A43 is connected between the negative side of the uninterrupted power source and the calling line through normally closed contacts of contact cluster $A44^2$ and the center tap A56 of transformer winding A51.

If set B is not busy, at set B call receiving relay B42 is connected to the center tap of winding B72 and returned to the negative side of the uninterrupted power source. As both test relay A43 and call receiving relay B42 return to the same negative, neither can operate. Accordingly at set A marking relay A44 now operates through positive uninterrupted power wire 28, break contact A63, break contact of contact cluster A43′, the coil of relay A44, make contact $A36^3$, and wire 30 to negative uninterrupted power. When marking relay A44 operates, contacts A44′ close, connecting between the local talking circuit of set A and the outgoing circuit previously described to set B. When the marking relay A44 operates, it also opens the circuit leading to the coil of test relay A43 at contact cluster $A44^2$, and applies positive potential to the center tap A56 of winding A51, through the make contact of contact cluster $A44^2$ and resistor A62 and then to the line circuit. Resistor 62 is optional, and is provided to limit operating currents. Call receiving relay B42 now operates, sounding ringing signal B74 by contacts B42′. This signal circuit receives power from wires 31 and 32 which feed interrupted current due to the action of interrupter 76, thus intermittently ringing the signal 74. When the hand set at set B is lifted, the ringing signal is cut off by means of hook switch transfer contacts which break the circuit to call receiving relay B42. The conversation then proceeds as above described. The circuit is marked busy by positive potential on the line due to make contact $A44^2$.

If, on the other hand, station B is busy, the operation of the calling switch applies test relay A43 to the line with return to negative potential. If the called line is busy, it is marked positive, and test relay A43 will operate, cutting off the circuit to marking relay A44 at contact A43'. Hence contact A44' cannot close and the connection of the local circuit to the called line is not possible. Contact A43', however, operates busy signal lamp 60.

It is important to note that this lock-out action takes place regardless of whether or not the hand set at station B has been lifted in response to the call. It is also important to note that ringing proceeds automatically without any manual ringing switch and ringing is intermittent. In sequential lock-out circuits previously known, as in U. S. Patent 2,181,715, it was necessary to have a ringing switch to produce the proper operation of the test relay and the marking relay. This is inconvenient from the standpoint of the user, requiring an additional manual step by the user. But it also made it possible for the user, failing to follow instructions, to break down the privacy of the system. If the ringing key were depressed first or substantially simultaneously with the calling key, the marking key could operate before the test relay could cut off the marking relay. Thus a connection was established to a busy line.

The above improper method of operation is unfortunately rather a natural way to operate the prior art sets, especially as the calling keys are within hand span distance of the ringing keys. This breakdown of privacy has been a serious obstacle in the commercialization of sequential relay lock-out systems.

The equipment according to the present invention provides sequential operation automatically without requiring the cooperation of the operator. The present equipment desirably is especially designed to slow down the operation of the marking relay or to slow down the closing of contact cluster $36^3$, $37^3$ and $38^3$. This gives test relay 43 ample time to operate if it is connected to a busy line before contact cluster $36^3$, $37^3$ or $38^3$ closes to activate the marking relay or before the marking relay is energized.

Delayed making of contact $36^3$, $37^3$ or $38^3$ is accomplished as well known by suitably spacing the operating studs for that contact cluster so that that contact cluster will close on overtravel after the other contact clusters have closed. Slow operation of marking relay 44 is achieved by means well known such as providing a conducting sleeve around the coil of the relay or by like means. The delay in the marking relay need only be very slight. If the test relay is a good fast operating relay, the delay in the marking relay need only be 10 to 20 milliseconds and this can readily be achieved by making contacts $36^3$, $37^3$ and $38^3$ late or by delaying the marking relay, whichever is most convenient.

It will be evident that the present invention for the first time provides a sequential relay lock-out system which is reliably foolproof and which does not require marginal relays.

When the conversation is concluded, replacing the hand set on its mounting at set B restores that set to idle condition by returning the hook switch to the condition shown. Returning the hand set at set A has the same effect and also unlatches the mechanism commonly provided to lock the calling switch in operative position, thus unlatching switch A36 and removing the busy mark on the home line of set B. At the same time switch A63 is momentarily opened by the unlocking mechanism provided, thereby deoperating marking relay A44 and opening contacts A44' so that further outgoing calls cannot be made without again testing the line called. When the hand set is replaced, the positive mark on the home line is removed and call receiving relay A42 is again connected through the transfer contact of hook switch A35. It will be evident of course that various changes in the simplex connection can be used, as illustrated in my copending application Serial No. 565,089, above referred to, in order to modify the circuit of the invention to suit various intercommunicating telephone circuits.

Figure 2:
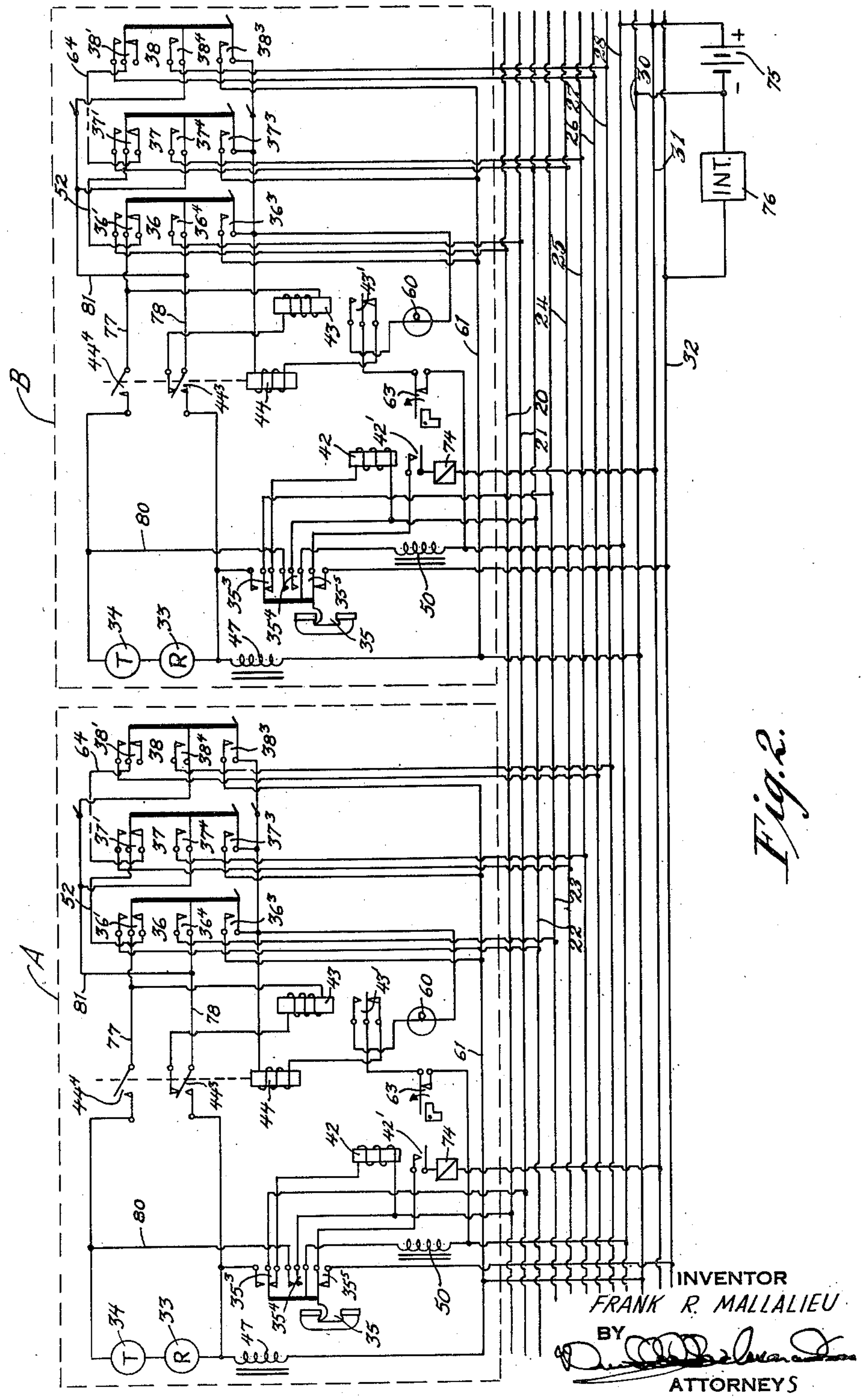

Figure 2 shows a circuit applying the principles of the invention, in which the testing relay and the marking relay, instead of being connected to a simplex circuit, are connected with one of the relays across the line.

As shown in Figure 2, the local talking circuit, including the receiver 33 and transmitter 34, includes contact clusters $44^3$ and $44^4$ of the marking relay 44 and lines 77 and 78 connected to the movable contacts of contact clusters 36' and $36^4$ of calling switch 36. Contact cluster $44^3$ connected in the local talking circuit between line 78 and the receiver includes a normally closed contact connected to one side of test relay 43, the other side of which is connected to line 77. The movable contact of contact cluster $44^3$ is connected to line 78. The normally open contact is connected to the receiver and also to choke coil 47 connected to negative uninterrupted power line 30. The normally open contact of contact cluster $44^3$ is also connected to the normaly open contact of hook switch contact cluster $35^3$ which includes a movable contact connected to home line 21 in set A and to home line 23 in set B. The normally closed contact of contact cluster $35^3$ of the hook switch is connected to one side of the coil of call receiving relay 42, the other side of which is connected to home line 20 in set A and to home line 22 in set B and also connected to one of the normally open contacts of contact cluster $35^4$ of the hook switch, the other normally open contact of this contact cluster being connected by lead 80 to the local talking circuit between the transmitter and contact cluster $44^4$. The movable contact of contact cluster $35^4$ of the hook switch is connected to choke coil 50 which is connected to positive uninterrupted power line 28.

Contact cluster $35^5$ of hook switch 35 includes a movable contact connected to one side of normally open contact cluster 42' of the call receiving relay, the opposite side of which is connected through ringing signal 74 to the positive side of the interrupted power source, and the normally closed contact of contact cluster $35^5$ is connected to the negative side of the interrupter power source by wire 32.

In Figure 2 calling switches 36, 37 and 38 have contact clusters $36^4$, $37^4$ and $38^4$ whose normally open fixed contacts are connected respectively to lines 23, 25 and 27 of set A and to lines 21, 25 and 27 of set B, and whose movable contacts are connected by leads 81 to lead 78. In contact clusters $36^3$, $37^3$ and $38^3$ the movable contacts are connected to one side of marking relay coil 44, the other side of the marking relay coil being connected to the normally closed fixed contact of test relay contact cluster 43', the movable contact of this contact cluster being connected to normally closed contact group 63, the opposite side of which is connected to line 28, the uninterrupted positive power line. Normally open fixed contact of contact cluster 43' is connected to busy lamp signal 60, the opposite side of which is connected to the movable contact of contact clusters $36^3$, $37^3$ and $38^3$.

Let us assume that a call is being made by set A of Figure 2 to set B. Calling switch A36 is operated, the coil of test relay A43 is bridged on the home line of set B (wires 22, 23) by break contact $A44^3$. Assuming that set B is not busy, the contacts of hook switch B35 connect call receiving relay B42 across the home line. As there is no potential effective in the individual circuit neither relay operates. Accordingly, marking relay A44 operates by negative uninterrupted power wire 30, make contact $A36^3$, the coil of marking relay A44, break contact A43', break contact A63, wire 28 and positive power. Operation of marking relay A44 cuts off test relay A43 at break contact $A44^3$ and prepares the talking circuit by closure of make contacts $A44^3$ and $A44^4$.

The called line is then marked busy by the application of the potential appearing at the terminals of the hand set, the negative being connected through choke coil A47 and the positive through choke coil A50 and make contact $A35^4$. The home line of set A is marked busy by this potential as soon as the hand set at set A is lifted.

On the other hand if set A called set B when set B was busy, positive potential would be found on home line 22 and negative potential on home line 23, so that test relay A43 would operate and prevent further operation of marking relay A44 by opening break contact A43'. Busy signal lamp A60 would then light up via make contact A43'.

It will be evident that in the privacy system of Figure 2 since the potential across the outer terminals of transmitter 34 and receiver 33 is the marking potential which must operate the test relay, this potential should be as high as possible. It is therefore desirable to increase the potentials across the lines, bearing in mind that choke coil 47 and 50 or equivalents, such as resistors, cannot be made to have too low resistance without running into danger of cross talk. It will be evident that it is immaterial in the present invention whether the transmitter and receiver units are made of higher resistance than is usual, or a resistor with preferably a condenser by-pass is connected in series with the transmitter and the receiver as in Patent 2,181,715, or a transformer winding is inserted in place of the transmitter and receiver in Figure 2 with the transmitter and receiver connected in series across another winding of the same transformer or the transmitter is shunt fed separately from the line by another pair of feeding coils and the two circuits are condenser coupled as well known. Any other expedient well known in the art may be used, depending upon the quality of test relay 43.

A further circuit arrangement may be made, employing the sequential relay lock-out which avoids the difficulty discussed. The test relay in this variant circuit is connected from one side of the power source to one side of the calling line. In this case the lower terminal of the coil of test relay 43 is connected to the positive uninterrupted power line 28 instead of to the wire 77 and the lower terminal of call receiving relay 42 is connected to the same positive potential instead of to the wire between contact cluster $35^4$ and the positive side of the home line (wire 20 for set A and wire 22 for set B). Test relay 43 will not operate when the called set is not busy as is desired. When the called set is busy, however, test relay 43 will find negative potential on the called line and will operate, locking out the called set.

Likewise when a calling set connects and marks the line, the call receiving relay 42 of the called set is operated by the negative busy marking potential through choke coil 47. An entirely similar operation would be obtained if the relays were connected to the other side of the line and returned to the negative pole of the power source.

The connection above described, in which the test relay is connected from one side of the line pair to the power line of potential opposite to that of the polarity of the line side will provide higher operating potential for the relays than if they merely bridged the line, because in the connection just discussed, the potential drop across one of the feeding coils is added to the potential drop across the transmitter-receiver combination.

In practical cases, where relatively high operating potentials are used along with high resistance feeding coils, providing good protection against cross talk, the increase in potential is very appreciable and the relay operation is therefore more reliable.

The connection of the relays between one side of the talking line and the source of potential of the same polarity as the line side will also provide improved relay operation compared to the method in which the relay merely bridges the line. In this case the potential drop across a feeding coil is applied to the test relay and in most practical cases this potential will exceed the potential across the line.

When higher voltages are available, a higher resistance relay will be used for a given relay operating power. Since lower currents are required, the relay will permit operation over longer lines and the clicks caused by the connection of test relays to busy lines will be less objectionable.

It will be evident that the test relay 43 and the call receiving relay 42 may suitably be connected in this manner in any of the ways disclosed and it is not necessary that both relays be connected in the same way in the particular circuit.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. A direct call secrecy intercommunication system including a transmitter, a receiver, a local talking circuit, a call receiving relay and a ringing signal for each station, incoming and outgoing lines between stations and a source of electric power operatively connected together, in combination with a test relay at each station, a marking relay at each station, means operative when the local station is calling another station for connecting at least one side of the outgoing line pair with a terminal at the called station which is energized when the called station is busy, means for disconnecting the marking relay by energization of the test relay, means operative when the test relay is deenergized for energizing the marking relay, means operative when the marking relay is energized for completing the connection of the local talking circuit with the outgoing line, for preventing operation of the test relay and for operating the call receiving relay at the station called and thereby operating the ringing signal at the station called, and interrupting means interposed between the source of electric power and the ringing signal.

2. An intercommunication system of claim 1, in combination with means for delaying the operation of the marking relay to make it follow the operation, if any, of the test relay.

3. An intercommunication system of claim 2, in which the means for delaying the operation of the marking relay comprises sequentially operating contacts.

4. An intercommunication system of claim 2, in which the means for delaying the operation of the marking relay comprises means for delaying the magnetic response of the marking relay.

5. An intercommunication system of claim 1, in combination with simplex circuit means for interconnecting between one station and another.

6. An intercommunication system of claim 5, in which the simplex circuit means comprises a center transformer tap at the station called, and means for applying a positive potential to the center tap when a station is called.

7. An intercommunication system of claim 1, in which the means operative when the local station is calling another station connects the test relay from one side of the outgoing line pair to the power source at the potential opposite to that of said one side of the line pair.

8. An intercommunication system of claim 1, in which the means operative when the local station is calling another station connects the test relay from one side of the outgoing line pair to the power source at the potential the same as that of said one side of the line pair.

No references cited.